(12) United States Patent
Hozumi et al.

(10) Patent No.: US 12,050,290 B2
(45) Date of Patent: Jul. 30, 2024

(54) OBJECT DETECTION SYSTEM

(71) Applicant: AISIN CORPORATION, Aichi (JP)

(72) Inventors: Shinya Hozumi, Kariya (JP); Hisashi Inaba, Kariya (JP); Toshinori Tanaka, Kariya (JP); Koichi Sassa, Kariya (JP); Yuichi Ukai, Kariya (JP); Takuya Sakiuchi, Kariya (JP)

(73) Assignee: AISIN CORPORATION, Aichi (JP)

( * ) Notice: Subject to any disclaimer, the term of this patent is extended or adjusted under 35 U.S.C. 154(b) by 72 days.

(21) Appl. No.: 17/852,728

(22) Filed: Jun. 29, 2022

(65) Prior Publication Data

US 2023/0003862 A1 Jan. 5, 2023

(30) Foreign Application Priority Data

Jun. 30, 2021 (JP) ................................. 2021-109445

(51) Int. Cl.
*G01S 7/52* (2006.01)
*G01S 15/04* (2006.01)
*G01S 15/931* (2020.01)

(52) U.S. Cl.
CPC .......... *G01S 7/52006* (2013.01); *G01S 15/04* (2013.01); *G01S 2015/938* (2013.01)

(58) Field of Classification Search
CPC . G01S 7/52006; G01S 15/04; G01S 2015/938
USPC ......................................................... 367/93
See application file for complete search history.

(56) References Cited

U.S. PATENT DOCUMENTS

| | | | |
|---|---|---|---|
| 11,770,677 B1* | 9/2023 | Lesesky .................. | H04W 4/48 |
| | | | 455/456.1 |
| 2014/0148992 A1* | 5/2014 | Shaffer ............... | G01S 7/52006 |
| | | | 701/33.7 |
| 2018/0329044 A1* | 11/2018 | Nomura ................... | G01S 15/87 |
| 2020/0158868 A1* | 5/2020 | Ibata ....................... | G01K 11/22 |
| 2022/0417472 A1* | 12/2022 | Mobbs ................. | G05D 1/0231 |
| 2023/0054024 A1* | 2/2023 | Oba .......................... | A61B 5/18 |
| 2023/0179879 A1* | 6/2023 | Kodama ............. | H04N 25/633 |
| | | | 348/302 |

FOREIGN PATENT DOCUMENTS

JP 6413622 B2 10/2018

* cited by examiner

*Primary Examiner* — Jack K Wang
(74) *Attorney, Agent, or Firm* — Sughrue Mion, PLLC

(57) ABSTRACT

An object detection system includes: a plurality of object detection units. The object detection units each include a transmission and reception unit configured to transmit an ultrasonic wave and receive a reflected wave generated by reflection of the ultrasonic wave on an object, a reception circuit unit configured to detect a signal level of the reflected wave received by the transmission and reception unit, a detection unit configured to detect the object by comparing the signal level detected by the reception circuit unit with a predetermined signal threshold value, a temperature sensor configured to detect a temperature of an environment, and a detection sensitivity adjustment unit configured to adjust detection sensitivity of the reception circuit unit based on a second lowest temperature among temperatures detected by the respective temperature sensors in the plurality of object detection units.

3 Claims, 4 Drawing Sheets

OBJECT DETECTION SYSTEM

CROSS REFERENCE TO RELATED APPLICATIONS

This application is based on and claims priority under 35 U.S.C. § 119 to Japanese Patent Application 2021-109445, filed on Jun. 30, 2021, the entire content of which is incorporated herein by reference.

TECHNICAL FIELD

This disclosure relates to an object detection system.

BACKGROUND DISCUSSION

In the related art, for example, there is a technique of detecting, in a vehicle (an automobile or the like), an object (a wall, another vehicle, a passerby, or the like) by transmitting an ultrasonic wave in a vehicle exterior direction and receiving a reflected wave reflected by the object. An attenuation amount and a propagation speed when the ultrasonic wave propagates in air (outside air) are different depending on a temperature of the air (hereinafter also referred to as an "outside air temperature"). Therefore, if an accurate outside air temperature can be recognized (or estimated), object detection accuracy can be improved.

However, it is not preferable in terms of cost to install a sensor only for detecting the outside air temperature. Therefore, when an object detection unit is provided with a temperature sensor that detects an environmental temperature (atmospheric temperature), the outside air temperature can be estimated based on a temperature detected by the temperature sensor.

However, depending on an installation position of the object detection unit, the temperature sensor may be affected by engine exhaust heat, direct sunlight, or the like, a temperature significantly higher than the outside air temperature may be detected, and the outside air temperature may not be accurately estimated.

Therefore, when there are a plurality of object detection units, for example, there is a technique in which the lowest temperature among temperatures detected by the respective temperature sensors is estimated as the outside air temperature, and object detection is performed based on the outside air temperature. Accordingly, a certain effect can be obtained.

Examples of the related art include Japanese Patent No. 6413622.

However, in the above technique in the related art, for example, there is a problem that the object detection accuracy greatly decreases when the temperature sensor that detects the lowest temperature detects an abnormally low temperature due to a failure.

A need thus exists for an object detection system which is not susceptible to the drawback mentioned above.

SUMMARY

According to an example of this disclosure, an object detection system includes: a plurality of object detection units, in which the object detection units each include a transmission and reception unit configured to transmit an ultrasonic wave and receive a reflected wave generated by reflection of the ultrasonic wave on an object, a reception circuit unit configured to detect a signal level of the reflected wave received by the transmission and reception unit, a detection unit configured to detect the object by comparing the signal level detected by the reception circuit unit with a predetermined signal threshold value, a temperature sensor configured to detect a temperature of an environment, and a detection sensitivity adjustment unit configured to adjust detection sensitivity of the reception circuit unit based on a second lowest temperature among temperatures detected by the respective temperature sensors in the plurality of object detection units.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments (a first embodiment and a second embodiment) of an object detection system disclosed here will be described with reference to the drawings. Configurations of the embodiments described later and actions and effects obtained by the configurations are merely examples, and the embodiments disclosed here are not limited to the following description.

First Embodiment

Figure 1:
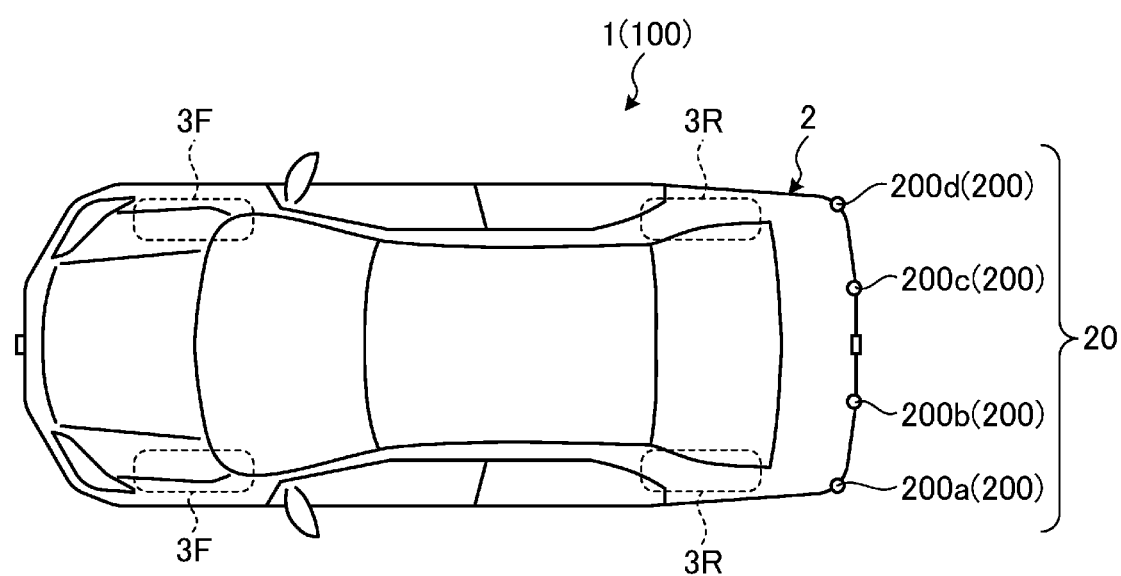
FIG. 1 is an exemplary and schematic diagram illustrating an appearance of a vehicle including an object detection system according to a first embodiment as viewed from above.

FIG. 1 is an exemplary and schematic diagram illustrating an appearance of a vehicle including an object detection system according to the first embodiment as viewed from above. The object detection system includes an electronic control unit (ECU) 100 as an in-vehicle control device and an object detection device 20 as an in-vehicle sonar. The object detection device 20 includes object detection units 200a to 200d. The ECU 100 is mounted inside a four-wheel vehicle 1 including a pair of front wheels 3F and a pair of rear wheels 3R. The object detection units 200a to 200d are mounted on an exterior of the vehicle 1.

In FIG. 1, as an example, the object detection units 200a to 200d are installed at different positions from one another on a rear end portion (rear bumper) of a vehicle body 2 as the exterior of the vehicle 1, but installation positions of the object detection units 200a to 200d are not limited thereto. For example, the object detection units 200a to 200d may be installed on a front end portion (front bumper) of the vehicle body 2, may be installed on side surface portions of the vehicle body 2, or may be installed on two or more of the rear end portion, the front end portion, and the side surface portions.

In the embodiment, hardware configurations and functions of the object detection units 200a to 200d are the same. Therefore, hereinafter, in order to simplify the description, the object detection units 200a to 200d are also referred to as an "object detection unit 200" when the object detection units 200a to 200d are not distinguished from one another. The number of the object detection units 200 is not limited to four as illustrated in FIG. 1.

Figure 2:
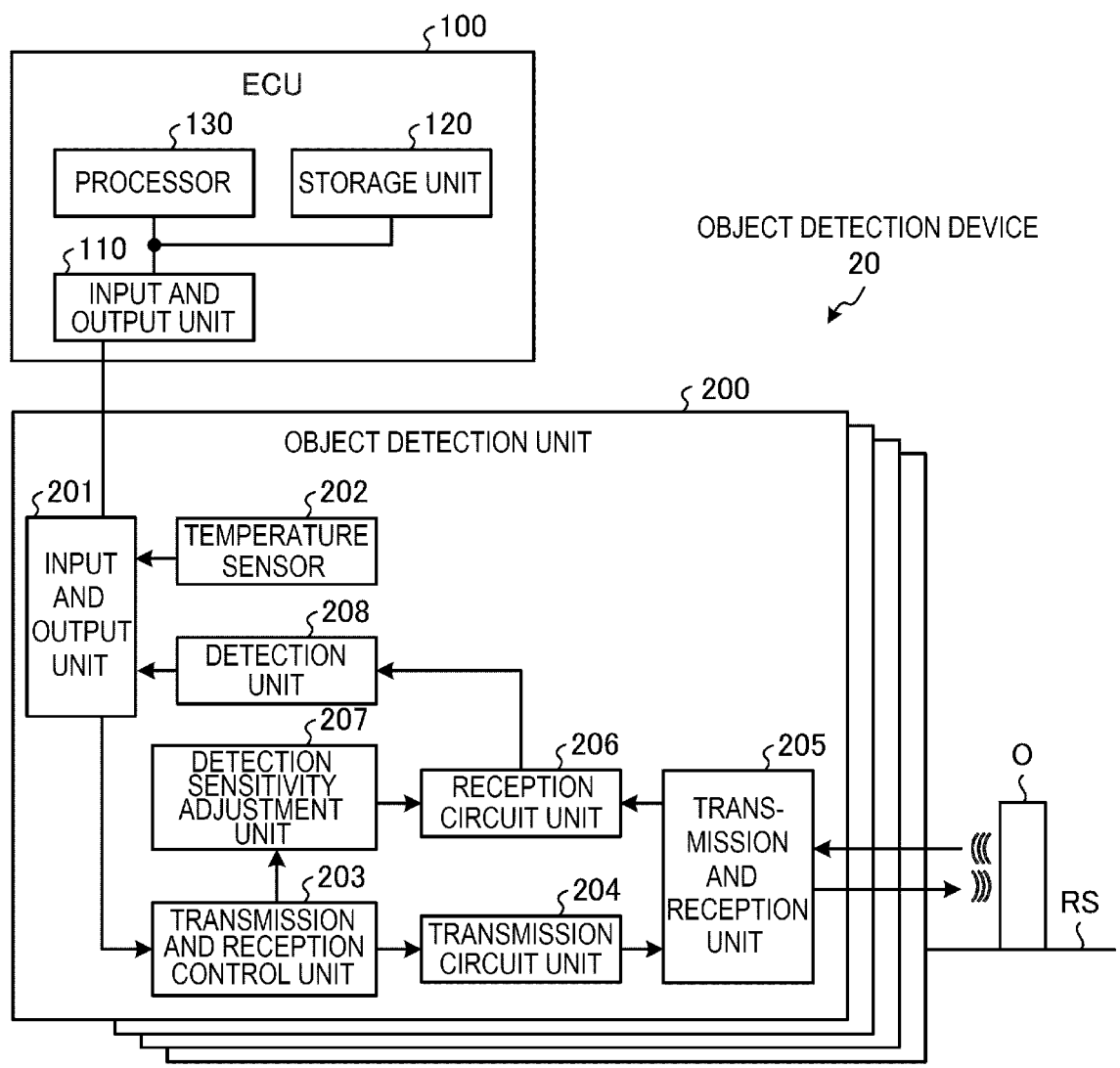
FIG. 2 is an exemplary and schematic block diagram illustrating a functional configuration of the object detection system according to the first embodiment.

FIG. 2 is an exemplary and schematic block diagram illustrating a functional configuration of the object detection system according to the first embodiment. In FIG. 2, lines and arrows connecting two configurations indicate a flow of main information, and information may flow between configurations that are not connected via the lines, or the information may flow in opposite directions of the arrows.

The ECU 100 has a hardware configuration similar to that of a normal computer. More specifically, the ECU 100 includes an input and output unit 110, a storage unit 120, and a processor 130.

The input and output unit 110 is an interface for implementing transmission and reception of information with the object detection unit 200.

The storage unit 120 includes a main storage device such as a read only memory (ROM) or a random access memory (RAM), and/or an auxiliary storage device such as a hard disk drive (HDD) or a solid state drive (SSD).

The processor 130 performs various processes to be executed in the ECU 100. The processor 130 includes an arithmetic device such as a central processing unit (CPU). The processor 130 implements, for example, various functions such as automatic parking by reading and executing a computer program stored in the storage unit 120.

The object detection unit 200 includes a hardware configuration similar to that of a normal computer. More specifically, the object detection unit 200 includes a storage unit, a processor, and the like. The storage unit includes a main storage device such as a ROM or a RAM, and/or an auxiliary storage device such as an HDD or an SSD. The processor performs various processes, and includes an arithmetic device such as a CPU. The processor implements various functions by reading and executing a computer program stored in the storage unit.

The object detection unit 200 includes, as functional configurations, an input and output unit 201, a temperature sensor 202, a transmission and reception control unit 203, a transmission circuit unit 204, a transmission and reception unit 205, a reception circuit unit 206, a detection sensitivity adjustment unit 207, and a detection unit 208.

The input and output unit 201 is an interface for implementing transmission and reception of information with the ECU 100.

The temperature sensor 202 detects a temperature of an environment (atmospheric temperature) and outputs detected temperature information to the input and output unit 201.

When the transmission and reception control unit 203 acquires a transmission instruction signal from the ECU 100 via the input and output unit 201, the transmission and reception control unit 203 outputs the transmission instruction signal to the transmission circuit unit 204. The detection sensitivity adjustment unit 207 is notified that the transmission instruction signal is output.

The transmission circuit unit 204 generates a pulse signal when the transmission instruction signal is input from the transmission and reception control unit 203, and outputs the pulse signal to the transmission and reception unit 205.

The transmission and reception unit 205 is driven by the pulse signal input from the transmission circuit unit 204, transmits an ultrasonic wave, and receives a reflected wave generated by reflection of the ultrasonic wave on an object.

The transmission and reception unit 205 includes, for example, a vibrator implemented by a piezoelectric element, and executes transmission and reception of the ultrasonic wave generated by the vibrator. In an example of FIG. 2, an object O (obstacle) installed on a road surface RS is exemplified as the object reflecting the ultrasonic wave from the transmission and reception unit 205. The transmission and reception unit 205 outputs a reception signal indicating a magnitude of the received reflected wave to the reception circuit unit 206.

The reception circuit unit 206 receives the reception signal from the transmission and reception unit 205, and detects a signal level of the reflected wave received by the transmission and reception unit 205. Specifically, for example, the reception circuit unit 206 performs amplification and A/D conversion on the reception signal input from the transmission and reception unit 205 to generate a digital reception signal, and outputs the digital reception signal to the detection unit 208. The reception circuit unit 206 includes a variable amplifier such that a reception gain can be changed based on a sensitivity adjustment instruction signal from the detection sensitivity adjustment unit 207.

The detection sensitivity adjustment unit 207 adjusts detection sensitivity of the reception circuit unit 206 based on the second lowest temperature among temperatures detected by the respective temperature sensors 202 in the plurality of object detection units 200. For example, the detection sensitivity adjustment unit 207 adjusts the detection sensitivity of the reception circuit unit 206 based on the second lowest temperature among the temperatures detected by the respective temperature sensors 202 in the plurality of object detection units 200 when a traveling condition (an average vehicle speed, a traveling time, and the like) set in advance based on a degree of cooling of the temperature of the environment by a traveling wind relating to the vehicle 1 is satisfied. The detection sensitivity adjustment unit 207 adjusts the detection sensitivity of the reception circuit unit 206 based on, for example, table information defining a relationship between the temperature and the reception gain and the second lowest temperature.

For example, the ECU 100 calculates vehicle speed information based on a detection result of a wheel speed sensor, an acceleration sensor, or the like provided in the vehicle 1, and transmits the vehicle speed information to the object detection unit 200. The object detection unit 200 calculates an average vehicle speed and a traveling time based on the vehicle speed information, and determines whether the traveling condition is satisfied.

The detection unit 208 detects the object by comparing the signal level detected by the reception circuit unit 206 with a predetermined signal threshold value. Specifically, the detection unit 208 detects the object by comparing the signal level indicated by the digital reception signal received from the reception circuit unit 206 with the predetermined signal threshold value. In addition, the detection unit 208 calculates a distance to the object based on a time difference between the transmission and reception unit 205 transmitting the ultrasonic wave and receiving the reflected wave. The detection unit 208 transmits a detection result or a calculation result to the ECU 100 via the input and output unit 201.

Figure 3:
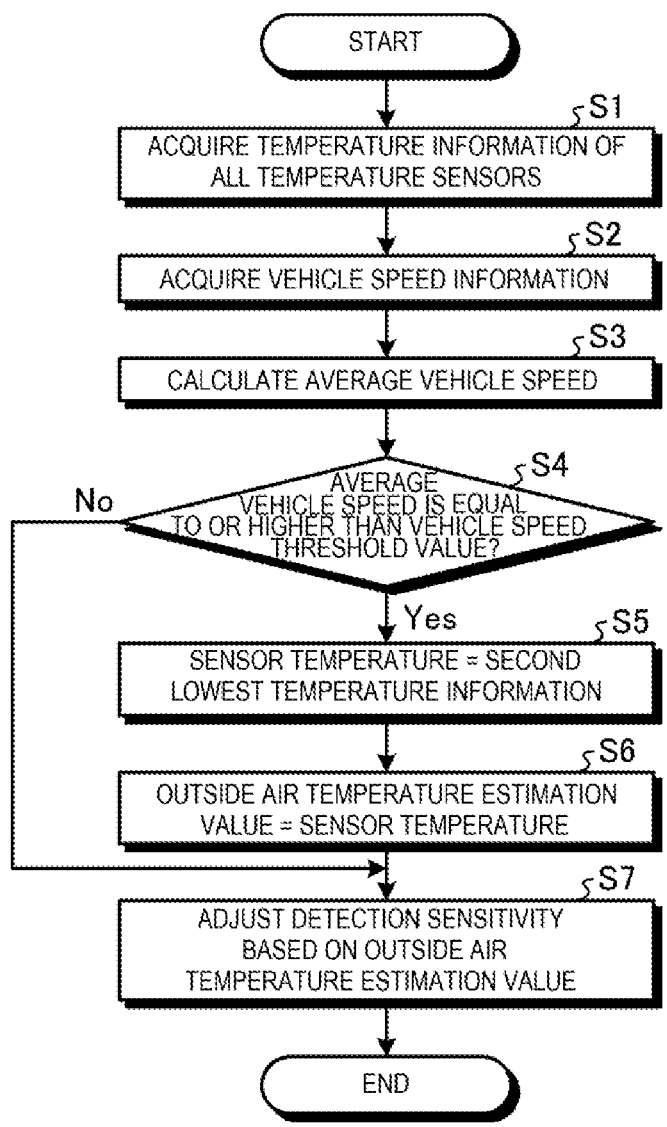
FIG. 3 is an exemplary and schematic flowchart illustrating a series of processes executed by an object detection unit according to the first embodiment.

FIG. 3 is an exemplary and schematic flowchart illustrating a series of processes executed by the object detection unit 200 according to the first embodiment.

First, in step S1, the input and output unit 201 acquires temperature information of all the temperature sensors 202.

Next, in step S2, the detection sensitivity adjustment unit 207 acquires the vehicle speed information from the ECU 100.

Next, in step S3, the detection sensitivity adjustment unit 207 calculates the average vehicle speed (for example, the average vehicle speed for the latest several minutes) based on the vehicle speed information.

Next, in step S4, the detection sensitivity adjustment unit 207 determines whether the average vehicle speed is equal to or higher than a vehicle speed threshold value (whether the traveling condition is satisfied). When the determination is Yes, the process proceeds to step S5, and when the determination is No, the process proceeds to step S7.

In step S5, the detection sensitivity adjustment unit 207 sets the second lowest temperature information among all pieces of temperature information as a parameter "sensor temperature".

Next, in step S6, the detection sensitivity adjustment unit 207 sets the sensor temperature as a parameter "outside air temperature estimation value".

The outside air temperature estimation value is updated when the second lowest temperature information among all the pieces of temperature information is first set at the start of an engine, and then the process of step S6 is performed.

In step S7, the detection sensitivity adjustment unit 207 adjusts the detection sensitivity of the reception circuit unit 206 based on the outside air temperature estimation value.

Accordingly, according to the object detection system of the first embodiment, by adjusting the detection sensitivity of the reception circuit unit 206 based on the second lowest temperature among the temperatures detected by the plurality of temperature sensors 202, object detection accuracy can be improved in consideration of a possibility of a failure of the temperature sensor 202.

That is, a probability that two or more temperature sensors 202 fail at the same time is very low as compared with a probability that one temperature sensor 202 fails. Therefore, even when the lowest temperature is output from the failed temperature sensor 202 and is an abnormal value, the second lowest temperature that is normal can be used. Therefore, sensitivity adjustment of the reception circuit unit 206 can be appropriately performed, and a detection distance for the object detection can be increased or a possibility of erroneously detecting the road surface as the object can be reduced.

By adjusting the detection sensitivity of the reception circuit unit 206 when the above travelling condition is satisfied, it can be assumed that each of the temperature sensors is cooled by the traveling wind resulting from the traveling of the vehicle, and the object detection accuracy can be further improved. That is, the temperature sensors 202 and surrounding members thereof heated by engine exhaust heat, direct sunlight, or the like can be cooled by the traveling wind, and the sensitivity adjustment of the reception circuit unit 206 can be appropriately performed.

Second Embodiment

Next, the second embodiment will be described. Description of matters similar to those of the first embodiment will be omitted as appropriate. FIGS. 1 and 2 are the same as those in the first embodiment. The temperature sensor 202 periodically detects the temperature of the environment.

The detection sensitivity adjustment unit 207 sets the second lowest temperature as the outside air temperature estimation value when the second lowest temperature is lower than the latest outside air temperature estimation value.

The detection sensitivity adjustment unit 207 sets, as the outside air temperature estimation value, a value calculated based on a predetermined calculation formula using the second lowest temperature and the latest outside air temperature estimation value when the second lowest temperature is equal to or higher than the latest outside air temperature estimation value and is lower than a value obtained by adding a predetermined temperature increase threshold value to the latest outside air temperature estimation value.

The detection sensitivity adjustment unit 207 sets the latest outside air temperature estimation value as the outside air temperature estimation value when the second lowest temperature is equal to or higher than the value obtained by adding the predetermined temperature increase threshold value to the latest outside air temperature estimation value.

Then, the detection sensitivity adjustment unit 207 adjusts the detection sensitivity of the reception circuit unit 206 based on a newly-obtained outside air temperature estimation value.

Figure 4:
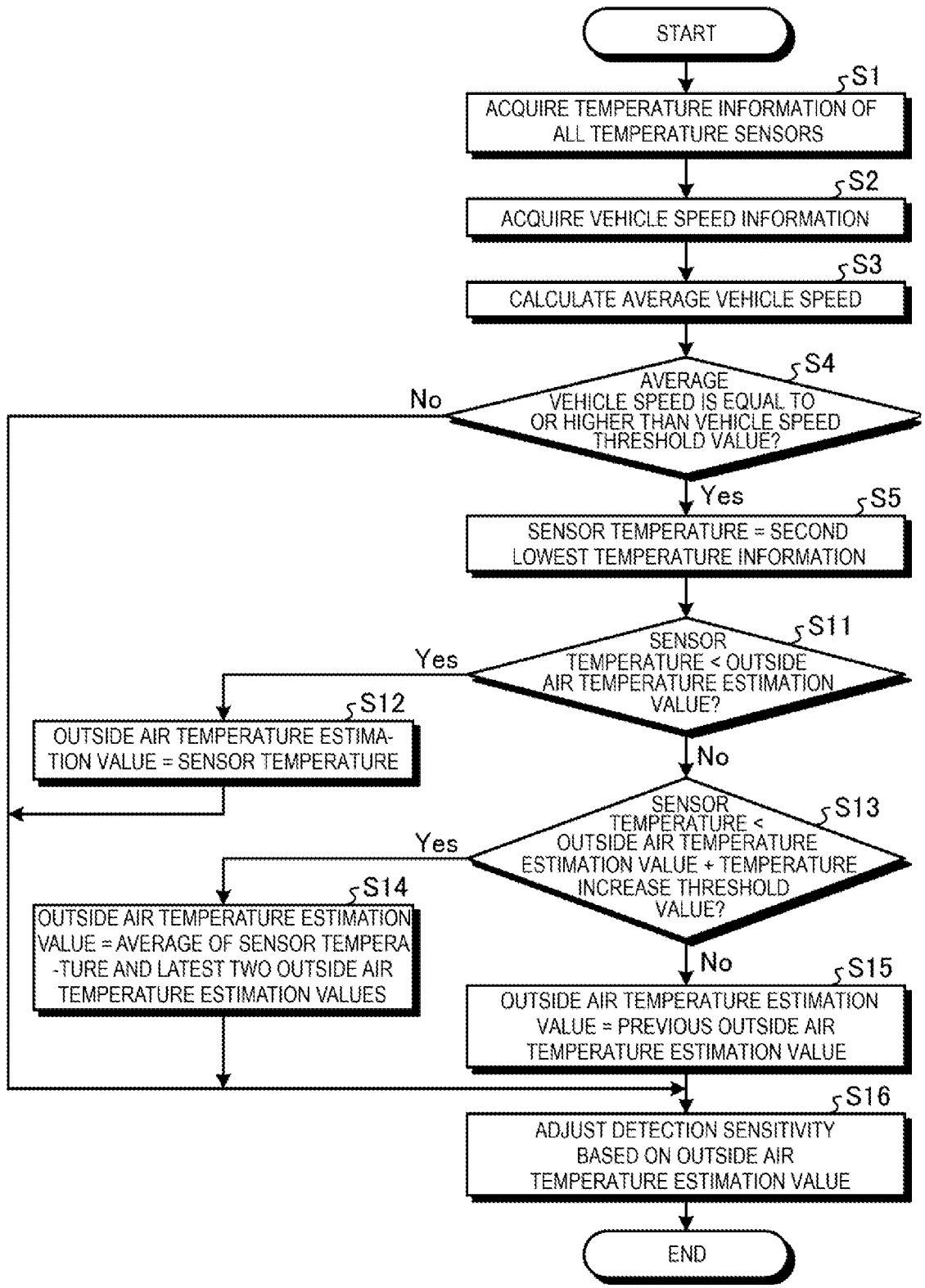
FIG. 4 is an exemplary and schematic flowchart illustrating a series of processes executed by an object detection unit according to a second embodiment.

FIG. 4 is an exemplary and schematic flowchart illustrating a series of processes executed by an object detection unit according to the second embodiment. Steps S1 to S5 are the same as those in FIG. 3.

After step S5, in step S11, the detection sensitivity adjustment unit 207 determines whether the sensor temperature (second lowest temperature) is lower than the latest outside air temperature estimation value, when the determination is Yes, the process proceeds to step S12, and when the determination is No, the process proceeds to step S13.

In step S12, the detection sensitivity adjustment unit 207 sets the sensor temperature as the parameter "outside air temperature estimation value".

In step S13, the detection sensitivity adjustment unit 207 determines whether the sensor temperature (second lowest temperature) is lower than the value obtained by adding the predetermined temperature increase threshold value to the latest outside air temperature estimation value. When the determination is Yes, the process proceeds to step S14, and when the determination is No, the process proceeds to step S15.

In step S14, the detection sensitivity adjustment unit 207 sets an average of the sensor temperature and the latest two outside air temperature estimation values as the parameter "outside air temperature estimation value".

In step S15, the detection sensitivity adjustment unit 207 sets the previous outside air temperature estimation value as the parameter "outside air temperature estimation value". That is, the parameter "outside air temperature estimation value" is not changed.

In step S16, the detection sensitivity adjustment unit 207 adjusts the detection sensitivity of the reception circuit unit 206 based on a newly-obtained outside air temperature estimation value.

Accordingly, according to the object detection system of the second embodiment, by comparing the second lowest temperature with the latest outside air temperature estimation value or the value obtained by adding the predetermined temperature increase threshold value to the latest outside air temperature estimation value, the outside air temperature estimation value can be set to a more appropriate value, and the object detection accuracy can be further improved.

Specifically, when the second lowest temperature is lower than the latest outside air temperature estimation value, the second lowest temperature is set as the outside air temperature estimation value. When the second lowest temperature is equal to or higher than the latest outside air temperature estimation value and is lower than the value obtained by adding the predetermined temperature increase threshold value to the latest outside air temperature estimation value, a temperature between the second lowest temperature and the latest outside air temperature estimation value is set as the outside air temperature estimation value. When the second lowest temperature is equal to or higher than the value obtained by adding the predetermined temperature increase threshold value to the latest outside air temperature estimation value, the second lowest temperature is not adopted because the temperature is high, and the latest outside air temperature estimation value is set as the outside air temperature estimation value. Accordingly, the object detection accuracy can be further improved by setting the outside air temperature estimation value to a more appropriate value according to a case, and adjusting the detection sensitivity of the reception circuit unit 206 based on the outside air temperature estimation value.

In step S14, the outside air temperature estimation value is the average of the sensor temperature and the latest two outside air temperature estimation values, but the embodiment disclosed here is not limited thereto. For example, the outside air temperature estimation value may be an average of the sensor temperature and the latest one outside air temperature estimation value, or may be an average of the sensor temperature and the latest three or more outside air temperature estimation values. When averaging, weighted (for example, the newer the information, the heavier the weight) averaging may be used.

While embodiments and modifications of the present disclosure have been described, these embodiments and modifications have been presented by way of example only, and are not intended to limit the scope of the disclosure. Indeed, the novel embodiments and modifications described above may be embodied in a variety of other forms, and various omissions, substitutions and modifications may be made without departing from the spirit of the disclosure. The accompanying claims and their equivalents are intended to cover such forms or modifications as would fall within the scope and spirit of the disclosure.

For example, a part of the functions of the object detection units 200 may be performed by the ECU 100. Specifically, for example, the ECU 100 may calculate the average vehicle speed by the detection sensitivity adjustment unit 207.

According to an example of this disclosure, an object detection system includes: a plurality of object detection units, in which the object detection units each include a transmission and reception unit configured to transmit an ultrasonic wave and receive a reflected wave generated by reflection of the ultrasonic wave on an object, a reception circuit unit configured to detect a signal level of the reflected wave received by the transmission and reception unit, a detection unit configured to detect the object by comparing the signal level detected by the reception circuit unit with a predetermined signal threshold value, a temperature sensor configured to detect a temperature of an environment, and a detection sensitivity adjustment unit configured to adjust detection sensitivity of the reception circuit unit based on a second lowest temperature among temperatures detected by the respective temperature sensors in the plurality of object detection units.

According to such a configuration, by adjusting the detection sensitivity of the reception circuit unit based on the second lowest temperature among the temperatures detected by the plurality of temperature sensors, object detection accuracy can be improved in consideration of a possibility of a failure of the temperature sensor.

In the object detection system described above, the object detection system is installed in a vehicle, and the detection sensitivity adjustment unit adjusts the detection sensitivity of the reception circuit unit based on the second lowest temperature among the temperatures detected by the respective temperature sensors in the plurality of object detection units when a traveling condition set in advance based on a degree of cooling of the temperature of the environment due to a traveling wind relating to the vehicle is satisfied.

According to such a configuration, by adjusting the detection sensitivity of the reception circuit unit when the above travel condition is satisfied, it can be assumed that each of the temperature sensors is cooled by the traveling wind resulting from traveling of the vehicle, and the object detection accuracy can be further improved.

In the object detection system described above, the temperature sensor periodically detects the temperature of the environment, and the detection sensitivity adjustment unit sets the second lowest temperature as an outside air temperature estimation value when the second lowest temperature is lower than a latest outside air temperature estimation value, sets, as the outside air temperature estimation value, a value calculated based on a predetermined calculation formula using the second lowest temperature and the latest outside air temperature estimation value when the second lowest temperature is equal to or higher than the latest outside air temperature estimation value and is lower than a value obtained by adding a predetermined temperature increase threshold value to the latest outside air temperature estimation value, sets the latest outside air temperature estimation value as the outside air temperature estimation value when the second lowest temperature is equal to or higher than the value obtained by adding the predetermined temperature increase threshold value to the latest outside air temperature estimation value, and adjusts the detection sensitivity of the reception circuit unit based on a newly-obtained outside air temperature estimation value.

According to such a configuration, by comparing the second lowest temperature with the latest outside air temperature estimation value or the value obtained by adding the predetermined temperature increase threshold value to the latest outside air temperature estimation value, the outside air temperature estimation value can be set to a more appropriate value, and the object detection accuracy can be further improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection system, comprising:
a plurality of object detection units, wherein
the object detection units each include a transmission and reception unit configured to transmit an ultrasonic wave and receive a reflected wave generated by reflection of the ultrasonic wave on an object, a reception circuit unit configured to detect a signal level of the reflected wave received by the transmission and reception unit, a detection unit configured to detect the object by comparing the signal level detected by the reception circuit unit with a predetermined signal threshold value, a temperature sensor configured to detect a temperature of an environment, and a detection sensitivity adjustment unit configured to adjust detection sensitivity of the reception circuit unit based on a second lowest temperature among all temperatures detected by all the respective temperature sensors of the plurality of object detection units.

2. The object detection system according to claim 1, wherein the object detection system is installed in a vehicle, and the detection sensitivity adjustment unit adjusts the detection sensitivity of the reception circuit unit based on the second lowest temperature among the temperatures detected by the respective temperature sensors of the plurality of object detection units when a traveling condition set in advance based on a degree of cooling of the temperature of the environment due to a traveling wind relating to the vehicle is satisfied.

3. The object detection system according to claim 2, wherein each of the temperature sensors periodically detects the temperature of the environment, and the detection sensitivity adjustment unit sets the second lowest temperature as an outside air temperature estimation value when the second lowest temperature is lower than a latest outside air temperature estimation value, sets, as the outside air temperature estimation value, a value calculated based on a predetermined calculation formula using the second lowest temperature and the latest outside air temperature estimation value when the second lowest temperature is equal to or higher than the latest outside air temperature estimation value and is lower than a value obtained by adding a predetermined temperature increase threshold value to the latest outside air temperature estimation value, sets the latest outside air temperature estimation value as the outside air temperature estimation value when the second lowest temperature is equal to or higher than the value obtained by adding the predetermined temperature increase threshold value to the latest outside air temperature estimation value, and adjusts the detection sensitivity of the reception circuit unit based on a newly-obtained outside air temperature estimation value.

* * * * *